June 17, 1969  GENTARO NOYORI ET AL  3,450,751
CONTINUOUS OPTICAL RESOLUTION OF RACEMIC GLUTAMIC
ACID OR ITS SALTS
Filed June 15, 1964
FIG. 2
FIG. 1
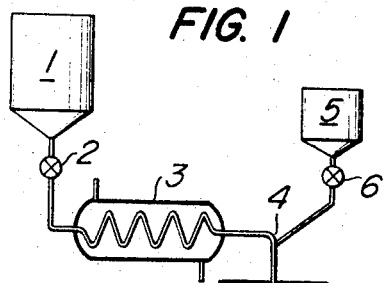
FIG. 3
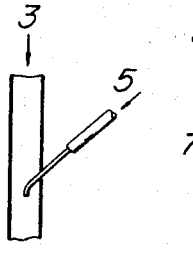
FIG. 5
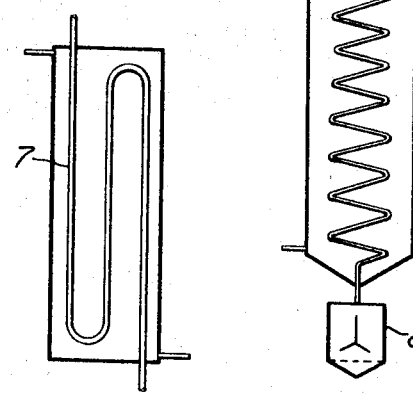
FIG. 6
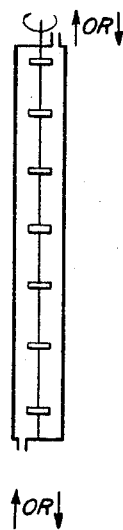
FIG. 4
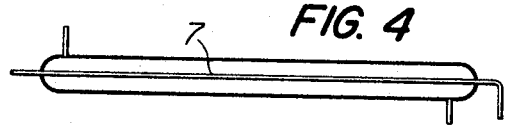
FIG. 7
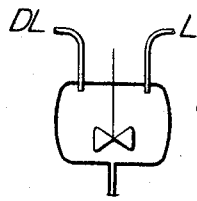

United States Patent Office 3,450,751
Patented June 17, 1969

3,450,751
CONTINUOUS OPTICAL RESOLUTION OF RACEMIC GLUTAMIC ACID OR ITS SALTS
Gentaro Noyori, Hidemoto Kurokawa, and Teiko Watanabe, Tokyo, Japan, assignors to The Noguchi Institute, Tokyo, Japan, a corporation of Japan
Filed June 15, 1964, Ser. No. 375,078
Claims priority, application Japan, June 15, 1963, 38/30,625; July 29, 1963, 38/37,699; Aug. 20, 1963, 38/43,584; Feb. 20, 1964, 39/8,784
Int. Cl. C07c 51/42, 67/06
U.S. Cl. 260—534    17 Claims

ABSTRACT OF THE DISCLOSURE

A process for the optical resolution of a racemate such as glutamic acid, racemic acylglutamic acid, and salts resolvable by seeding fractional crystallization. The process is continuously carried out by forming an aqueous supersaturated solution of the racemate, seeding with seed crystals of the desired isomer of the enantiomorphic, L- or D-form optically active isomer, allowing the seeded solution to flow in one direction without causing back flow mixing, growing the seed crystals of the optically active form and separating the grown crystals from the solution.

---

This invention relates to a process of continuous optical resolution of racemic glutamic acid or racemic glutamates which comprises suspending crystals of either L- or D-optically active glutamic acid or glutamate in a supersaturated solution of racemic glutamic acid or glutamates, causing the said solution with the suspended crystals to flow in one direction, carrying out the growth of the said crystals and separating the solid phase from liquid phase. This invention also relates to a process for suspending optically active crystals and to a process for preparing the optically active antipode from the separated mother liquor or liquid phase.

The object of these processes is to provide a process of simple, safe operation and high efficiency for preparing separated crystals of an optically active isomer by resolving racemic glutamic acid which is obtained through synthesis or racemization of optically active isomers.

In further detail, the process can be described by the following three points.

(1) This invention has as an object to provide a process for preparing high-purity optically active isomers through the continuous and efficient resolution of racemic glutamic acid by simplified operation.

(2) Another object is to provide a very advantageous process for the optical resolution of racemic glutamic acid, which needs no purification process consisting of completely separating and removing the undesired antipode or raceme for the seed crystal, and comprises a simplified process of adding the seed crystal, easy operation of resolution and easy control thereof.

(3) A still further object is to achieve a more simple and advantageous resolution process by improving the resolution process for resolving racemic glutamic acid into the optically active isomers thereof, which is carried out by the simplification of required operations and the more efficient preparation of high-purity optically active isomers.

As regards the seeding fractional crystalization process for resolving the raceme of glutamic acid, various processes of batch type and continuous type resolution have so far been known. In the batch type resolution, for example, by introducing the seed crystals of L-form into a supersaturated solution of a racemate, the L-form crystals are gradually grown in the solution in general. Optically active crystals of the seeded form are obtained from this slurry by carrying out the separation of solid phase from liquid phase after a proper period. The D-form crystals are obtained from the mother liquor by carrying out the same operation.

The conventional processes of continuous optical resolution are as follows. There have been proposed, for example, a process which comprises using a resolution column of tower type, charging and flowing the supersaturated solution of a racemic upward from the tower bottom, feeding the seed crystals gradually from the tower top and taking out the active product gradually from the lower part of the tower, which settles as it grows, and, for the improvement of the said process, a process which comprises circulating a supersaturated solution of a racemate in a tank suspending the seed crystals within, promoting the growth of the seed crystals to the optimum crystal size, and separating and recovering the crystals. These conventional processes have not been successful enough in the more stable and efficient preparation of high-purity active crystals on an industrial resolution scale. The present inventors have investigated the features of the batch type resolution in further detail, and have found a quite novel process of continuous optical resolution. That is, this invention is to provide a process of continuous resolution and an apparatus therefor, which comrpises adding and mixing optically active crystals into the flow of the supersaturated solution of racemic glutamic acid or a glutamate, making the said solution with the suspended crystals flow in one direction, in other words, preventing them from being subjected to substantial back mixing as a whole even under agitation, promoting the growth of the said crystals and separating solid phase from liquid phase.

The process of this invention is explained below in detail in comparison with the conventional processes.

In the resolution of a racemate according to the fractional resolution process of batch type seeding, when the seed crystals of L-form are, for example, introduced into the supersaturated solution of the racemate, the seeded crystals of L-form grow gradually while the same amount of D-form in dissolved state with that of the precipitated L-form crystals is accumulated in the said solution. The amount of precipitated L-form reaches a certain value and, after a definite period of time, the precipitation of D-form begins and continues until the solubility of the racemate reaches the equilibrium value corresponding to the present resolution temperature. Therefore, the relative amount of the desired optically active isomer contained in the precipitated crystals shows a maximum value after a certain period of time and then begins to be contaminated with another isomer. For the most efficient resolution, it is desirable to separate solid phase from liquid phase at the point of maximum resolution.

This point is, however, very critical, so it is necessary for obtaining the crystals of only the seeded form, for example, L-form to rapidly separate solid phase from the mother liquor, wherein the corresponding antipode, D-form, is accumulated and tends to precipitate. This point can be determined by fixing such process conditions as the supersaturation degree of the racemate, the amount of the optically active isomer, the resolution temperature, the amount of agitation and the like. The higher the supersaturation degree of the racemate may be, the larger yield of the optically active isomer per unit amount of the solution per unit time of the reaction.

The critical point of maximum resolution can be clearly determined experimentally in a batch type resolution, but can hardly be applied, however, on an industrial scale in view of the following difficulties.

In carrying out batch type resolution on a large scale, for example, it is necessary to prepare a large amount of the supersaturated solution at the same time, preserve this solution according to circumstances, agitate the solution so that the seeded optically active crystals may be well suspended, control the temperature and other conditions and separate solid phase from liquid phase. Other difficulties are in the growth of the desired optically active isomer, for example, L-form crystal, that there are always dangerous tendencies to generate the simultaneous precipitation of D-form crystal due to a very trifling change in conditions, for the resolution is carried out in the solution which tends to have the antipode, D-form crystal, precipitated.

This invention provides a continuous process of advantageous resolution by taking advantage of the merits of the batch type resolution process and improving the disadvantageous features of that process. In the process of this invention, the crystals of optically active isomer are suspended in a supersaturated solution of a racemate, the solution with the suspended crystals is made to flow in one direction without being subjected to substantial back mixing, and the said crystals are grown. As this flow in one direction is maintained of the piston flow to a certain extent, the critical point according to the batch type resolution can clearly be prescribed in this piston flow. That is, the retention time $t$ is given by the formula:

$$t = V/F$$

where V represents the internal volume of the resolution column and F represents the flow rate. As $t$ can directly be prescribed by the length of the column in case of the piston flow, so the maximum resolution point can be obtained by controlling the flow rate. Therefore, this invention has such merit that the separation of solid phase from liquid phase can instantaneously be completed at the optimum moment by readily controlling the retention time to the most suitable value.

Besides, the flow is of tubular shape, which makes control of temperature easy, that is, the control of precipitation, keeping every section of the column interior in a stationary state and carrying out a true continuous optical resolution. Those effects have not been achieved by the conventional processes.

From this point of view, the conventional processes have a fault that the precipitating amount of the optically active isomer is increased in a resolution tank with the lapse of time changing the ratio of solid phase to liquid phase, so a definite state can hardly be maintained constantly. Further, during this period, the antipole accumulated in the solution always tends to precipitate even at a low concentration. If the antipode starts to precipitate, the preceding resolution is no longer successful, since the precipitate is contaminated. It is, therefore, required to keep the degree of supersaturation of the solution low and circulate the solution before the resolution reaches a maximum, which naturally lowers overall efficiency of the process.

According to the process of this invention, even when increasing the degree of supersaturation, the retention time of the antipode in the solution can arbitrarily be controlled and the separation of solid phase from liquid phase can rapidly be carried out at any desirable time, so the high-purity optically active isomer can be obtained in higher effciency in a shorter time.

The best advantage of the present invention is that the operation can be carried out without the occurrence of back mixing. During the resolution process, therefore, even if the crystallization of the undesired form begins due to some accidental cause, only the corresponding section within the tower is degenerated while the preceding and following resolution systems are not affected at all by the precipitation of the undesired crystals. As regards this point, the operation should be stopped in the conventional batch type process or the conventionally recommended continuous process, as soon as the crystallization of the undesired form starts. The resolution should be carried out under constant supervision for achieving the success of the resolution. This troublesome supervision is not required in the process of the present invention.

As described above, the process of this invention has been discovered by a detailed investigation of the batch type resolution, so it is a quite rational and true continuous process of optical resolution which can easily be carried out and can lead to the preparation of high-purity optically active isomer safely and effectively.

The performances of this invention and a suitable apparatus therefor are explained below in detail.

As regards the apparatus of this invention, in FIG. 1, a racemic solution is introduced from a raceme solution tank 1 through a valve or pump 2 to a cooler 3, in which the solution is cooled to form a supersaturated solution thereof in the range of 105% to 200% of the saturation concentration and is fed to 4. On the one hand, an optically active isomer is introduced from an optically active isomer tank 5 through a valve or pump 6 to 4, at which point it is added and mixed wih the racemic supersaturated solution to form a solution containing the optically active crystals in a state of suspension. This solution passes in the same direction through a partial apparatus 7 under circumstances such that the solution is not subjected to substantial back mixing and, during this period, the growth of the optically active crystal is promoted. In a solid-liquid separation apparatus 8 connected to 7, the solid phase is thereafter separated from the liquid phase.

Instead of a cooling process, as shown in FIG. 1, which employs the cooler 3 for preparing the raceme supersaturated solution, it is also possible to employ the following processes, such as partial neutralization, condensation, adding hydrochloric acid in case of hydrochlorides or ammonia in case of ammonium salt, adding an organic solvent which can be admixed with water but does not react with racemic glutamic acid or glutamates, or adding inorganic salts.

The part 4 at which the raceme supersaturated solution is mixed with the optically active isomer to form the suspended crystals of the optically active isomer in FIG. 1 may be provided with a mixing device 9 for sufficiently mixing the racemic supersaturated solution fed from 3 with the optically active isomer fed from 5 as shown in FIG. 2 or the optically active isomer fed from 5 may be continuously introduced into the flow of the raceme supersaturated solution starting from 3, as shown in FIG. 3.

The partial apparatus 7 of spiral shape in FIG. 1 may be of straight shape as shown in FIGS. 4 and 6 or of a wavy shape or other bending form as shown in FIG. 5, so long as the solution is subjected to no substantial back mixing, for the purpose of removing the heat of crystallization and controlling the resolution temperature to keep the degree of supersaturation constant, which is also effective for the performance of this invention.

Further, it is desirable that the solid-liquid separation apparatus 8 in FIG. 1 is provided with two or more centrifugal separators for continuously and rapidly separating the slurry fed from the partial apparatus 7 into solid and liquid phases by employing a proper change-over operation.

In the case of using a resolution column available for proper stirring as shown in FIG. 6, it is also possible to transfer the slurry from the top or the bottom or to use the column lying horizontally.

A special mixing tank may be installed for the purpose of mixing, which feeds the mixture into the resolution column. As regards mixing, instead of using a magnetic stirrer from the outside as shown in FIG. 2, a stirring rod may be inserted for stirring as shown in FIG. 7. Also, the radiation of ultrasonic waves to the mixing section is very effective for the performance of this invention, for it causes homogeneous development of countless microcrystalline nuclei of the desired optically active isomer preferentially out of the solution containing the racemate and the optically active isomer in the state of supersaturation, so that the optically active isomer can be prepared as a milky suspension.

In FIG. 1, the optically active isomer fed from the optically active isomer tank 5 may be introduced to 4 in the form of solution, crystals, powder, or a suspension thereof in a solution of the same optically active isomer or in a solution of the corresponding raceme, and, at 4 being mixed with the racemic supersaturated solution, if necessary, under stirring, is prepared as suspended in the solution.

The degree of supersaturation of the racemate according to this invention is in the range of 105% to 200%, preferably 110% to 160%, of the saturation concentration. When the degree of supersaturation is less than 105% of the saturation concentration, the growth rate of the crystal is low and the yield is small for the unit amount of the liquid in low efficiency. When the degree of supersaturation is more than 200% of the saturation concentration, the operation can hardly be carried out for there are increasing tendencies that the racemate or the undesired form of isomer starts to crystallize.

The amount of the optically active isomer to be added either in the form of solution or crystal should be at least 2% that of the racemate for carrying out the resolution. From the viewpoint of efficiency, the upper limit of this amount is about 100%, which amount is so large that the growth rate is remarkably accelerated but can hardly be controlled and the transportation of the slurry becomes difficult and the efficiency is lowered.

As compared with a process for adding the optically active isomer in the form of solution and preparing the suspended only optically active isomer by homogeneous nuclei generation under stirring or the like out of the solution in supersaturated state of the racemate and the optically active isomer, other suitable processes for using the seed crystal are as follows.

(1) The optically active isomer is suspended in a solvent.

(2) The optically active isomer containing a small amount of the racemate is suspended in a solvent whose amount is much larger than that enough for completely dissolving the racemate only, so it is used under the complete dissolution of the racemate.

(3) In the resolution of free acid in the co-presence of less than an equivalent amount of acid or alkali, it is possible to use the suspended solution of the crystals of optically active free acid in the state of the racemate being dissolved in the corresponding acid or alkali.

(4) In case of using hydrochlorides, the raceme is completely dissolved by controlling the amount of hydrochloric acid.

The resolution which is carried out by using such milky seed as obtained according to one of the above-mentioned processes is usually superior in respect of optical purity of the obtained crystal, and ease of the resolution operation to that of using seed crystals which are purified by removing the racemate by a conventional process.

For the preparation of seed crystals of uniform size, the crystals of the optically active isomer only or containing some amount of the antipode or raceme is added with water or a solvent which is excessive enough to dissolve them and, after dissolving all the crystals by heating once, crystal particles of a definite size can be prepared from this solution by rapid or slow cooling, stirring or other operations.

As the milky seed thus obtained in the form of liquid can easily be applied and introduced into the resolution system to be very smoothly and uniformly dispersed in solution, so the resolution starts at the same time, proceeds uniformly and can readily be controlled.

Racemic glutamic acid which can be resolved by the process of this invention is confined to the entire pH range in which free glutamic acid can exist as a bottom substance or can be co-present with less than an equivalent amount of acid or alkali for the free glutamic acid or with hydrochloride, ammonium salt, alkali earth metal salts such as zinc salt, magnesium salt, calcium salt and the like which are available for the resolution of fractional crystallization process. The process of this invention is also available for the resolution of acyl glutamic acids. In case of using hydrochloride, excessive hydrochloric acid may be co-present for controlling the concentration of the solution.

In this case, the critical concentration of hydrochloric acid is 20% by weight, for in cases using more concentrated hydrochloric acid it becomes difficult to control the concentration and the solubility of glutamic acid hydrochloride in an aqueous solution of hydrochloric acid of such a concentration is little different from that of the free glutamic acid to decrease the yield for the unit liquid amount disadvantageously.

In case of using ammonium salt, it is more desirable for the control of concentration and viscosity to carry out the resolution in an aqueous solution in the co-presence of some free ammonia, whose critical concentration is 20% by weight. In the co-presence of more concentrated ammonia, the control of the concentration is difficult, for a large amount of ammonia tends to escape from the resolution system. Further, for maintaining the proper concentration, degree of supersaturation and viscosity, it is also suitable for the process to add alcohols having 1 to 5 carbon atoms or ketones having 3 to 7 carbon atoms to an aqueous solution of the said racemic glutamic acid or salts thereof which do not react with the additive.

In the resolution of obtaining the crystals of hydrochloride or ammonium salt, the optically active isomer may be added in the form of solution, may be co-present in advance or may be added to the state of the co-presence.

The resolution according to this invention can be carried out at an arbitrary temperature lower than 80° C., wherein the rate of dehydration of glutamic acid to pyroglutamic acid is not so large. Especially in case of obtaining good resolution results at higher or lower temperature within the said range, the structure of the resolution apparatus and the control of temperature are so simple and easy that the resolution can be carried out at a desirable temperature.

For carrying out the resolution more profitably according to this invention, it is desirable to prevent the solution from being mixed along the direction of the flow by controlling the flow speed and the degree of stirring if necessary so that the flow in the resolution column may be maintained in the state of almost perfect flotation, even if the solution is mixed normal to the direction of the flow. Although partial back mixing may be somewhat allowed, it is desirable to form a piston stream for causing no substantial back mixing.

For this purpose, the length of the column should be large enough for the diameter of the column so that no substantial back mixing may be caused as a whole, even if the partial mixing in the direction of the flow is caused due to the effect of the flow speed. Such purpose is achieved when the length of the flow column is greater than the diameter thereof in a ratio of at least 10:1 as shown in the drawing.

On the other hand, in obtaining the active antipode from the resolved mother liquor, the process of this invention may be carried out being connected with the preceding process in series or parallel, with or without the supply of racemic-form solution.

The following process may also be available.

In obtaining the crystals of the optically active other isomer which is co-present in the mother liquor, the racemate of the same kind is added, mixed, stirred if necessary, and dissolved to saturation and, at the same, the optically active isomer starts to crystallize to yield crystals of the high-purity optically active isomer. The preparation of such optically active isomer is carried out during the period of the raceme saturation or until the raceme is saturated, so there is no danger which causes the crystallization or mixing of the raceme or the undesired optically active isomer, the equilibrium state is maintained long after it is once obtained, so the separation is not required to be completed in a limited short time and the operation can be made very stably. The optical purity of the obtained active isomer reaches more than 98%, so no further purification is especially required and, at the same time, a saturated solution of the pure raceme at that temperature is obtained.

In case of repeating the resolution according to the seed crystal fractional crystallization process, the resolution can be carried out even if a small amount of optically active isomer remains in the resolved mother liquor, but it is considerably difficult for the present techniques in the art to control the resolution by providing the resolution conditions according to the residual rate of the said isomer. In the resolution process on an industrial scale, therefore, it is necessary for the repetition of resolution processes in high reproducibility to easily obtain the saturated state of raceme only by a simple operation, which is available for the material solution to be resolved in the next process.

The optically active crystals and the resolution material solution for the next succeeding process can be obtained at the same time by selection of the proper operation temperature. The three steps consisting of the resolution and purification of the antipode and the manufacture of the resolution material solution in the conventional resolution process can be replaced by one simple step.

As compared with the conventional known process for crystallizing the antipode after the separation of an optically active isomer, which comprises keeping the resolution mother liquor at a definite temperature for a long time, it is more convenient in this invention that the precipitation of the antipode can be completed in a short time with a smaller input and output of heat, according to the following reason. That is, the dissolution of glutamic acid or salts thereof is endothermic while the crystallization is exothermic. The absolute values of heat are equal to each other between the two reactions in the case of the same compound of the same form.

For example, in case of hydrochloride (0 to 50° C. average), the heat of crystallization is 2,390 cal./mol for the racemate and 3,190 cal./mol for the optically active isomer. The exothermic precipitation of the antipode causes a rise of the solution temperature which tends to obstruct the precipitation. The dissolution of the raceme in this solution is endothermic, the heats of the two reactions are mutually compensated by each other, so the precipitation of the antipode and the dissolution of the raceme are remarkably accelerated. There are sometimes required heating or cooling more or less according to a difference between the dissolution amount of the racemate and the precipitation amount of the antipode.

In the conventional process, it is necessary to remove the heat to the outside of the system in the precipitation and to heat the system newly in the dissolution.

The required time for obtaining the equilibrium depends upon the crystal size of the added racemate, the kind of salt, the degree of stirring and the resolution temperature. The reaction can be completed in 1 to 10 minutes by selecting the proper conditions.

As described above, high-purity optically active isomer and the saturated solution of the racemate are readily and safely obtained by the simple operation according to this invention, which shortens the conventional steps consisting of the resolution and purification of the said isomer and the preparation of the racemic solution and remarkably simplifies the apparatus and operation thereof.

The actual examples according to this invention are given below. This invention is operable on a much larger scale in the same principle as that of the examples.

The degree of supersaturation used here is given by:

Degree of supersaturation (percent) =

$$\frac{\text{Solute quantity (g.) for unit solvent quantity (g.)}}{\text{Saturated solute quantity (g.) for unit solvent quantity (g.) at the resolution temperature}}$$

Example 1

The flow of 2.06 kg. aqueous solution of DL-glutamic acid hydrochloride (concentration: 106 g./100 g. water) was made at the rate of 100 ml./min. and was cooled through a spiral tube by circulating water at 20° C. A spherical part of 2 cm. in inside diameter is provided at the place where the said solution is cooled to just 25° C. and to which an aqueous solution containing 47.5 g. L-glutamic acid hydrochloride in 100 g. of water introduced at the rate of 10 ml./min. After sufficiently admixing the introduced solution with the DL-form solution by means of a magnetic stirrer from the outside, the mixture is introduced into a spiral tube of about 6 mm. in inside diameter and 15 m. in length which is wound in a spiral shape of 10 cm. in diameter and 80 cm. in height under the circulation of water at 25° C. surrounding the tube.

During the flowing-down of the mixture in this spiral tube, the growth of the crystal is carried out. The retention time of the mixture was 4 minutes and 48 seconds. The discharged slurry was by turns subjected to centrifugal separation. The recovered crystals weighed 94.8 g. and exhibited optical purity, that is, an L-isomer content of 98.3%.

Example 2

Using the same apparatus as in Example 1, the flow of an aqueous solution containing 106 g. of DL-glutamic acid hydrochloride in 100 g. of water was made at the rate of 100 ml./min. and being cooled to 25° C. was mixed with 40 cc. of an aqueous saturated solution of DL-glutamic acid hydrochloride containing 20 g. of suspended crystals of D-glutamic acid hydrochloride which was introduced at the rate of 10 ml./min.

After the growth of the crystals was completed, the discharge slurry was subjected by turns to centrifugal separation by changing over three centrifugal separators every 10 minutes.

All the time required for the resolution was 4 hours. The recovered crystals weighed 7.49 kg. and exhibited a D-isomer content of 96.6%.

The thusly resolved mother liquor was kept at 52° C., added with 7.49 kg. of DL-glutamic acid hydrochloride under stirring. After 1 hour, the precipitated crystals were filtered, washed with a small amount of cold water and dried.

The recovered crystals weighed 3.74 kg. and exhibited L-isomer content of 98.2%. On the other hand, the specific rotation of the obtained mother liquor was nearly zero and the concentration of racemic glutamic acid hydrochloride was 105.8 g./100 g. of water.

Example 3

2.13 kg. of a saturated solution of DL-glutamic acid at 50° C. was introduced at the rate of 50 ml./min. into a resolution column consisting of a glass tube of about 6 mm. in inside diameter and 60 m. in length being wound of into spiral shape of 30 cm. in diameter and 1.2 m. in height in a thermostat of 25° C. with a cooling control. When the temperature of the solution was lowered to 35° C., the solution was mixed with an aqueous solution containing 1 part of less than 200 mesh crystals of L-glutamic acid suspended in 2 parts of a saturated aqueous solution of DL-glutamic acid at 20° C. which was introduced at the rate of 5 ml./min., kept at 25° C. After completing the growth of the crystals, the discharged slurry was subjected to centrifugal separation.

The recovered crystals weighed 95.3 g. and exhibited L-isomer content of 96.5%.

Example 4

Using the same apparatus as in Example 1, the length of the resolution tube was 25 m. instead of 15 m. Water of 25° C. was circulated outside the resolution tube.

1.785 kg. of 10% by weight hydrochloric acid containing saturated racemic glutamic acid hydrochloride at 50° C. were introduced at the rate of 100 ml./min. under cooling. When it was cooled to 28° C., in the spherical part as in Example 1, the solution was mixed with a condensed solution at the rate of 5 ml./min. which was prepared by dissolving 1 part of L-form crystals at 50° C. in 1 part of water and, at the same time, was subjected to the radiation of 10 kg., 150 w. ultrasonic wave and introduced into the said resolution column.

The discharged slurry was separated centrifugally by turns.

The recovered crystals being cleansed with 100 cc. of 10% hydrochloric acid and dried weighed 170 g. and exhibited an L-isomer content of 97.3%.

Example 5

2.34 kg. of a saturated solution of monoammonium DL-glutamate at 35° C. was cooled to 15° C. and introduced at the rate of 200 ml./min. into a glass tube of 6 mm. in inside diameter and 20 m. in length wound in spiral form of the diameter of 10 cm. and height of 80 cm, and kept at 15° C. in a cylinder-type bath with cooling control.

The introductory part of the glass tube was provided with a spherical part of 2 cm. in diameter. Crystals of ammonium L-glutamate monohydrate of less than 200 mesh were introduced at the rate of 5.0 g./min. and mixing was carried out by stirring of a magnetic stirrer from the outside. The slurry thus obtained was subjected by turns to centrifugal separation. The recovered crystals were washed with 30 cc. of concentrated ammonia, washed with 100 cc. of methanol and dried and weighed 239 g. and exhibited an L-isomer content of 98.7%.

After heating the resolved mother liquor thus obtained to 35° C., it was mixed with 408 g. of monoammonium DL-glutamate monohydrate.

After 30 minute stirring at the same temperature, the precipitated crystals were filtered, washed with concentrated ammonia and then methanol and dried in the same manner as described above. The recovered crystals weighed 202 g. and exhibited a D-isomer content of 99.1%.

The specific rotation of the mother liquor was nearly zero and the concentration thereof was 140 g./100 g. of water.

Example 6

Using the same apparatus as in Example 3, the resolution of free glutamic acid was carried out in an aqueous solution of 2% hydrochloric acid.

An aqueous solution of 2% hydrochloric acid being saturated with DL-glutamic acid at 50° C. was introduced at the rate of 200 ml./min. into the resolution column under cooling in circulation of 30° C. water. When it had cooled to 35° C., it was mixed with the same D-form suspended solution as in Example 3 which was introduced at the rate of 10 ml./min. The discharged slurry was subjected by turns to centrifugal separation. The recovered crystals weighed 150 g. and exhibited an L-isomer content of 89.7%.

Example 7

A saturated solution of racemic glutamic acid hydrochloride at 50° C. which was cooled to 25° C. was introduced at the rate of 60 cc./min. and a saturated solution of L-glutamic hydrochloride at 30° C. which was cooled to 25° C. was introduced at the rate of 6 cc./min. Both solutions were mixed well with each other by stirring by a part of ellipsoid-like shape of 50φ in diameter and 30φ in height. The mixture was fed at the rate of 40 cm./min. into a U-shaped glass tube of 15φ in diameter and 15 m. in length with an overcoat, in which water of 25° C. was circulated.

The retention time was 15 minutes, the resolution was carried out for 2 hours. The discharged slurry was subjected to the separation of solid phase from liquid phase by changing over the two centrifugal separators.

The water content of the recovered crystals was 5% while the dry crystals weighed 2.28 kg. and exhibited an optical purity of 85%.

Example 8

Using the same U-shaped resolution column with the overcoat as in Example 7, acetyl glutamic acid was resolved. A saturated solution of the racemate at 30° C. which was cooled to 23° C. was transferred at the rate of 100 ml./min. and an aqueous solution containing 1 part of 200 mesh crystal of D-acetyl glutamic acid suspended in 2 parts of water was fed at the rate of 5 ml./min. After sufficient stirring, the mixture was introduced into the resolution column and the discharged slurry was separated centrifugally by turns. The overcoat was cooled with circulating water of 23° C.

After 30 minutes, the recovered crystals weighed 74 g. and exhibited an optical purity of 78.2%.

Example 9

Using the same apparatus as in Example 3, an aqueous solution containing 3% (concentration for anhydride) of magnesium DL-glutamate was fed at the rate of 50 ml./min. and was mixed with an aqueous solution containing 1 part of magnesium DL-glutamate 4½ $H_2O$ suspended in 2 parts of water which was added at the rate of 3 ml./min. The resolution was carried out for 30 minutes under the circulation of water at 24° C. outside of the tube.

The recovered crystals weighed 47.1 g. and exhibited an optical purity of 82.3%.

What is claimed is:

1. A continuous, seeding fractional crystallization process for the optical resolution of racemic glutamic acid, glutamates and derivatives thereof, said process comprising forming an aqueous supersaturated solution of a compound selected from the group consisting of racemates of glutamic acid, glutamic acid salts, acyl glutamic acids and glutamates, suspending one enantiomer of said compoud in the supersaturated solution, causing the supersaturated solution having said one enantiomer suspended therein to flow in a crystallization zone in one direction without any substantial back flowing of the supersaturated solution to thereby induce the growth of crystals of said one enantiomer in the supersaturated solution and form a slurry of said one crystallized enantiomer in the supersaturated solution, removing the slurry from the crystallization zone and separating said slurry into a solid phase comprising crystals of said one enantiomer and a liquid phase.

2. A process according to claim 1 wherein said one enantiomer is suspended by adding powder crystals thereof to the supersaturated solution.

3. A process according to claim 1 wherein said one enantiomer is suspended by adding a solution including said one enantiomer to the supersaturated solution.

4. A process according to claim 3 wherein the solution including said one enantiomer includes the racemic compound to be resolved.

5. A process according to claim 1 wherein said one enantiometer is suspended by preliminarily preparing a solution in which the racemic compound and said one enantiomer co-exist.

6. A process according to claim 1 comprising accelerating the growth of crystals of said one enantiomer by subjecting the supersaturated solution to ultrasonic radiation.

7. A process according to claim 1 wherein the glutamic acid salt is a glutamic acid hydrohalide and the glutamate is ammonium glutamate or an alkali earth metal glutamate.

8. A process according to claim 7 wherein the alkali earth metal glutamate is zinc, magnesium or calcium glutamate.

9. A process according to claim 1 wherein the resolution is effected in the presence of an alcohol of 1-5 carbon atoms or a ketone of 3-5 carbon atoms.

10. A process according to claim 1 wherein the resolution is effected at a pH of 0.6 to 7 in the presence of less than an equivalent amount of acid or alkali.

11. A process according to claim 1 wherein the compound is racemic glutamic acid hydrochloride and the resolution is effected in the presence of free hydrochloric acid of less than 20% concentration.

12. A process according to claim 1 wherein the compound is racemic ammonium glutamate and the resolution is effected in the presence of free ammonia of less than 20% concentration.

13. A process according to claim 1 wherein the resolution is effected at a temperature of at most 80° C.

14. A process according to claim 1 in which the enantiomer is L form.

15. A process according to claim 1 in which the enantiomer is D form.

16. A process according to claim 1 wherein two stages of the process are effected in which the enantiomers are respectively of L and D form, and said stages are carried out in series.

17. A process according to claim 1 wherein two stages of the process are effected in which the enantiomers are respectively of L and D form, and said stages are carried out in parallel.

References Cited

UNITED STATES PATENTS

| | | | |
|---|---|---|---|
| 3,028,395 | 4/1962 | Gillingham. | |
| 3,253,026 | 5/1966 | Gillis | 260—534 |
| 3,260,744 | 7/1966 | Ito | 260—534 |
| 3,266,871 | 8/1966 | Miziguchi et al. | 23—273 |
| 2,683,739 | 7/1954 | Wiedman | 260—534 XR |
| 3,038,937 | 6/1962 | Cave | 260—534 |
| 3,278,572 | 10/1966 | Frump | 260—534 |

LORRAINE A. WEINBERGER, *Primary Examiner.*

ALBERT P. HALLUIN, *Assistant Examiner.*

U.S. Cl. X.R.

23—273; 260—429.9